United States Patent [19]

Headley

[11] 4,213,407
[45] Jul. 22, 1980

[54] FLASH DRYING SLUDGE DERIVED FUEL PROCESS

[75] Inventor: Kenneth N. Headley, Tonawanda, N.Y.

[73] Assignee: Hooker Chemicals & Plastics Corporation, Niagara Falls, N.Y.

[21] Appl. No.: 973,770

[22] Filed: Dec. 27, 1978

[51] Int. Cl.² ............................................. F23G 5/04
[52] U.S. Cl. ................................ 110/346; 110/221; 110/224; 110/238; 110/244; 110/347
[58] Field of Search ............... 110/346, 347, 238, 244, 110/232, 221, 218, 224, 227

[56] References Cited

U.S. PATENT DOCUMENTS

| 1,809,819 | 6/1931 | Caller | 110/222 |
|---|---|---|---|
| 3,772,998 | 11/1973 | Menigat | 110/346 X |
| 3,805,715 | 4/1974 | Keller | 110/224 |
| 3,926,129 | 12/1975 | Wall | 110/346 X |
| 3,954,069 | 5/1976 | Loken | 110/346 X |
| 4,099,336 | 7/1978 | Maffet | 110/221 X |

OTHER PUBLICATIONS

"Williams SDF Systems;" Williams Patent Crusher and Pulverizer Company, Bulletin 939.
Vesilind, P. Aarne, "Treatment and Disposal of Wastewater Sludges," 1975, pp. 179-180.

Primary Examiner—Edward G. Favors
Attorney, Agent, or Firm—Peter F. Casella; Thomas T. Gordon; Howard M. Ellis

[57] ABSTRACT

A process for disposing of sewage sludge resulting from municipal type sewage plants, including the production of dry solid fuel which is used in the flash drying and in the deodorizing system. Supplemental fuels are not required. The system is capable of producing a sludge derived fuel (SDF).

10 Claims, 1 Drawing Figure

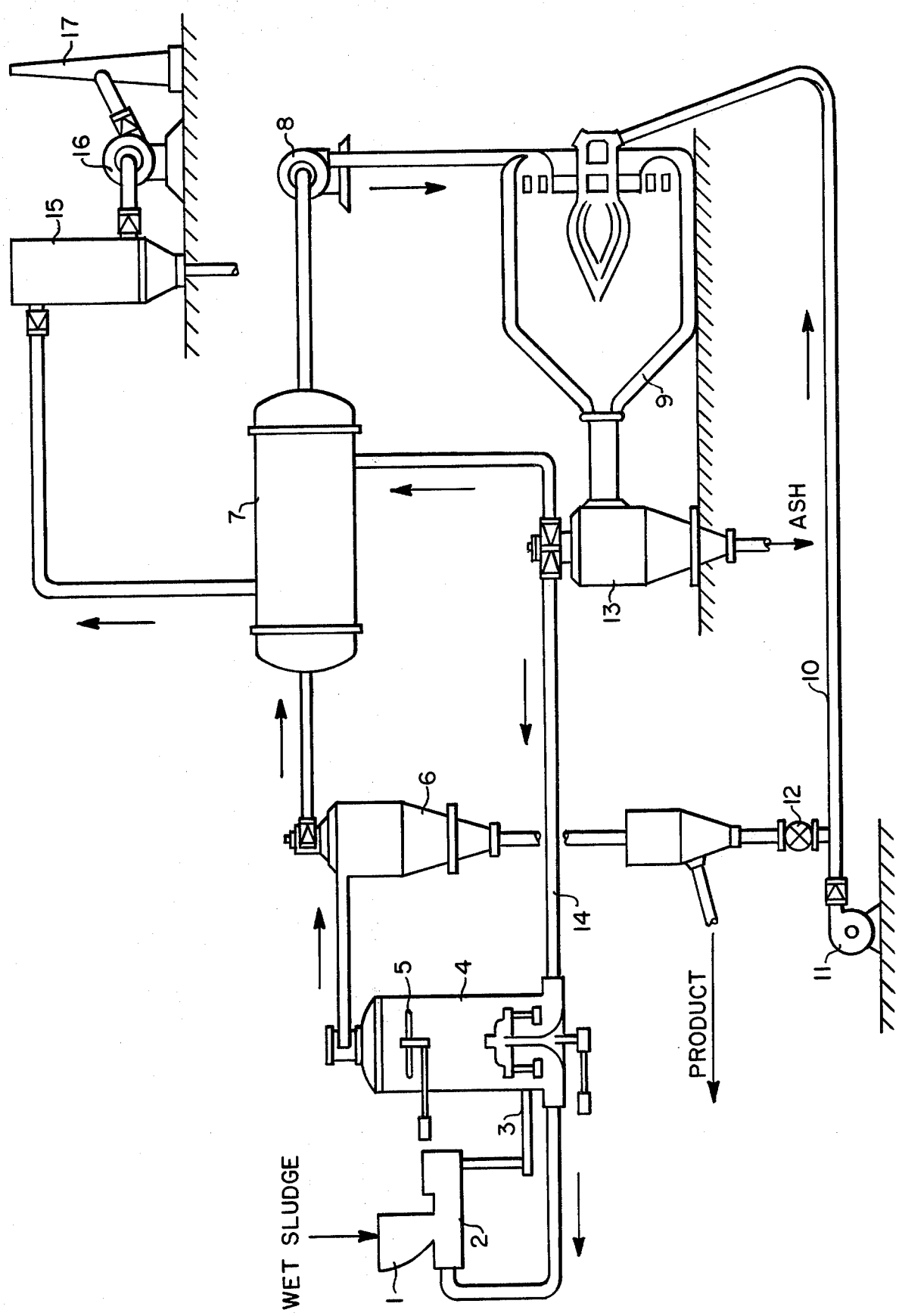

FLASH DRYING SLUDGE DERIVED FUEL PROCESS

BACKGROUND OF THE INVENTION

The processing of raw primary sewage, especially in municipal type sewage plants results in two primary streams, namely a raw primary sewage sludge and a primary clarifier liquor. Further processing is dependent upon two general variables: the requirements of local environmental standards and the degree of dewatering required for the proposed method of sludge disposal.

Raw primary sewage sludge may be laden with pathogenic organisms and can be dewatered mechanically to as high as 50% solids. Such organisms are normally destroyed through anaerobic digestion. Digester stability is quite sensitive and difficult to control, stray chemicals or toxins may kill the operation. Also, due to a minor cellular structure the digested sludge becomes more difficult to dewater.

The primary clarifier supernatent liquor is rarely returned to the environment due to high biochemical oxygen demand (BOD) in the form of dissolved solids. Charcoal filters may be used to absorb these solids but this is rarely economical. Chemical treatment is expensive and inefficient while producing an additional, rather inert sludge. Aeration is commonly used to reduce BOD and an activated sludge is produced which is most difficult to dewater by any method due to a highly cellular structure.

In typical secondary treatment plants digested and activated sludges are mixed and the resulting "mixed digested sludge" may be dewatered on drying beds to about 20% solids.

The major objectives insofar as environmental considerations are concerned are the destruction of pathogenic organisms and viruses, and the removal of BOD that might damage recipient water quality.

The considerations that one must keep in mind in dewatering the sludge are whether the dewatered sludge is to be used in land spreading such as in reclamation of farm lands and strip mines; whether it is to be used as secure land fill; whether it is to be incinerated; or whether it is to be dumped in the ocean.

Secure landfill is presently the most common method of sludge disposal in the United States. Dewatered sludge of all types may be disposed of in this way. When landfill is available, emphasis may be placed entirely on the environmental considerations of sewage treatment.

Incineration requires a maximum of dewatering. Primary digested sludge dewatered on drying beds to 25-35% solids is well suited for incineration. Most large cities have not converted to secondary treatment plants nor do they have available land or sea for alternative disposal. Over 25% of the sludge incinerated in the U.S. is primary digested sludge. Mixed digested sludge is often incinerated due to a lack of alternatives. Higher costs are incurred due to an increased excess air requirement, increased moisture content, larger equipment and lower efficiency.

Ocean dumping, where practiced, also requires dewatering to reduce the costs of transportation. The infamous New York sludge situation is a case in which dewatered raw primary sewage sludge has caused extensive environmental damage. Mixed digested sludge would be the best for disposal in a marine environment. There should exist strong currents to disperse the solids.

The Environmental Protection Agency (EPA) has declared formal guidelines for sludge disposal and utilization. This includes terminating ocean dumping programs by 1981. The guidelines will also result in increased cost of secure landfill. The present EPA attitude apparently indicates a preference for land application. Land used for spreading and composting sludge, storage of compost residues and other applications has been redefined as an integral part of the treatment process and is now eligible for Federal funds in the form of 75% matching grants. EPA regulations outline the extent to which sewage quality must be protected from toxins by industrial pretreatment in maintaining the option of land application where possible.

Public land applications require digested or stabilized sludge with high water content for pumping and large areas of available land which cannot be used for human consumption crops. Municipal incineration systems require a minimum of land and can be engineered to dispose of all types of municipal and industrial sludge, but investment costs are high and consumption of valuable fossil fuels may become prohibitive. The drying system of this invention requires no land, a minimum investment and no supplemental fuels when using dewatered sludge. Actual costs will be lower than most public and municipal systems.

PRIOR ART

It is often stated in the prior art literature that wet sludge has a relatively low fuel value and additional fuel is required for combustion. In fact, the typical sewage sludge of 20% solids with a dry heating value of 7000 btu/lb. has a wet heating value of only 1400 btu/lb. This fuel content is sufficient to sustain a theoretical flame temperature of only 800° F. (427° C.) which is, of course, quite inadequate since the combustion of carbon requires a minimum of 2000° F. (1100° C.).

Based on the illusion of such assumptions, the two main types of sludge incinerators in use almost exclusively are the multiple hearth incinerator and the fluidized bed incinerator. Both are excellent designs for the combustion of a substance of negligible thermal content.

In multiple hearth incineration the sludge is entered in the upper tier and drops through alternating out-hearths and in-hearths through the motion of rabble arms. The upper hearths are used for the cooling of exhaust gases and the reduction and drying of wet sludge. Toward the end of a 30 to 60 minute detention time, combustion of the drying sludge occurs. Slow burning slag and ash is removed from the bottom hearth to a quench tank. A 60% thermal efficiency can be expected for a typical multiple hearth furnace (MHF). A disadvantage is the requirement of up to 200% excess air for complete combustion.

It is well known that deodorizing of volatile gases requires temperatures of over 1000° F. (1100° C.). The cooled exhaust vapors must exit at 1000° F. (1100° C.) to avoid the use of an afterburner. This requires the use of additional fuel in the particular hearth designed for combustion where temperatures of 1800° F. (983° C.) are typical. Air is used in a central shaft to maintain constant refractory and rabble arm temperatures, and is subsequently used in combustion. Typically, greater quantities of cooling air would be required and discarded. The use of an afterburner may avoid these heat losses but requires additional fuel. U.S. Pat. No. 3,643,633 shows a commercial multiple hearth incinerator. Experiments have been performed over the last two years with multiple hearth pyrolysis. The afterburner is used without additional fuel and sludge as low as 24% solids has been disposed of autogeneously. The pyrolysis mode requires that the entire MHF be airtight and pressurized. (See EPA Contract 68-01-4227 entitled "Assessment of the Use of Refuse-Derived Fuels in Municipal Wastewater Sludge Incinerators, Dec. 30, 1977, Section 2.2.2, pages 2-14 to 2-18).

The fluidized bed furnace (FBF) consists of a bed of sand into which sludge is introduced. An upward flow of air suspends the particles. Grates and hearths are unnecessary. The turbulent motion and sand grinds the incoming sludge to small particles facilitating a greatly reduced residence time. As in the MHF, combustion occurs before the sludge is dry and, therefore, additional fuel is required to maintain the exit temperature of 1000° F. (1100° C.) for deodorizing. This fuel may be in the form of preheated air, preheated sand or a hearth burner. Advantages are the requirement of less than 40% excess air, a greatly reduced reactor volume and a thermal efficiency of over 80%. As with the typical MHF, use of the sludge thermal content is negligible. U.S. Pat. No. 3,772,999 shows a commercial fluidized bed furnace.

In the typical flash drying system, fossil fuels are burned in a furnace for the direct firing of a pulverizing mill. (Vesilind, P. Aarne [1974]- *Treatment and Disposal of Wastewater Sludges,* Ann Arbor Science Publishers, Inc. - Chapter 8). The vapors are deodorized and cooled in a combustion air preheater. Process thermal efficiency is less than 50% and the economics depend entirely upon the sale of dried sludge as a fertilizer.

A cage mill consisting of counter rotating cages of steel bars pulverizes the incoming mixed sludge as it dries. No attempt is made at fluid bed grinding or post mill classification for control of product size and as with most mills a bottom product is not available for mixing. In using the dusty dried sludge product for feed mixing the dangers of spontaneous combustion exist. Explosions have been known to occur in conveying, mixing, the cyclone collector and in the mill itself. The mixer must be provided with water sprays and the cyclone with a relief vent. Air is used as a conveying gas and enters the system as excess combustion air. This air is indirectly preheated by the hot exhaust gases. Control problems exist in firing supplemental fuels independently of the drying system. When feed rate or moisture content declines, fuel supply must be throttled accordingly while maintaining deodorizing temperatures. While this is done automatically startup and shutdown impose problems. Oxygen from the conveying system is not diluted by vapors at startup and without the vapor load, ignition temperatures are attained. The common presence of grease has caused explosions due to its low auto-ignition point.

OBJECTS OF THE INVENTION

It is an object of this invention to encourage sewage sludge disposal systems that are owned and operated by the private sector which are more efficient than the present public or municipally owned systems.

It is a further object of this invention to provide a process for sewage sludge disposal which produces a dried solid product for consumption in the drying process thus eliminating supplemental fuel requirements.

Other objects of the invention are to incorporate the deodorizing of exhaust gases, to eliminate the potential of spontaneous combustion common to sludge drying processes and to maintain maximum process efficiency.

Still an additional object of this invention is the recovery of energy when possible as a dry SDF which can be easily transported for use elsewhere.

BRIEF DESCRIPTION OF INVENTION

The present invention outlines a sludge disposal process whereby sludge is flash dried to a dry solid fuel, most or all of which is consumed in a furnace for the dual function of deodorizing exhaust gases and the direct firing of the flash drying mill. Excess SDF may be stockpiled for system startup. Further excess may be fired in refuse facilities or bagged as a sludge derived fertilizer.

DESCRIPTION OF THE DRAWING

The accompanying FIGURE is a diagramatic sketch of the Flash Drying Sludge Derived Fuel Process and further illustrates this invention.

Referring to the FIGURE, sludge with a solids content of 16–50% enters the system at (1) where it passes to a mixing box (2) wherein the wet sludge is mixed with partially dried sludge to increase the solids content, and is fed into the direct fired mill (4) through line (3) which is positioned to drop the feed directly on the rolls at the base of the fluid bed. In the mill (4) the sludge is exposed to a current of hot gas (14) which suspends the pulverized sludge particles as they grind against each other, flash drying. The gas flow coupled with the vapors produced during drying carries the small particles of dry sludge through a spinner separator (5) for size classification and into a cyclone (6) where the particles are separated from the vapor recycle stream. The vapor recycle stream passes into a vapor preheater (7) a heat exchanger, wherein the vapor recycle stream is elevated in temperature prior to being passed into the furnace (9) via a recycle vapor fan (8). This fan (8) controlled automatically, determines the rate of hot vapors as they are recirculated through the furnace-mill-preheater system as the quantity of sludge to be processed varies, and creates a negative pressure atmosphere in the mill. The furnace (9) may be fed with the fuel collected at (6) and fed to the burners through line (10). The combustion air fan (11) is automatically controlled to provide about 10% excess air which acts as a conveying gas for the SDF which enters at a rate determined by the furnace temperature control, through automatically modulated rotary air lock (12). The furnace exhaust gas passes to a cyclone collector (13) where the ash is removed. The system exhaust or stack gas, at the furnace exit temperature, (the minimum acceptable for deodorizing), is completely cooled in the vapor preheater (7) to within 75° F. (40° C.) of the dewpoint and passed into a bag collector (15) for particulate removal from which it enters a stack via an induced draft fan (16). A portion of the furnace exhaust gas is drawn through line (14) for direct firing of the mill (4) by means of the negative pressure system induced by the recycle vapor fan (8) which returns that portion of gas to the furnace.

DETAILED DESCRIPTION OF THE INVENTION

Successful and environmentally sound combustion of sludge requires an adequate supply of oxygen; intimate contact of gases and materials; sufficient contact time; and temperature controlled to efficiently process the sludge and deodorize exhaust gases. Combustion of sludge is accomplished in this invention by the following means:

Oxygen is supplied as combustion air and excess air is required due to the inefficiency of contact. It is desirable to reduce excess air requirements in maintaining high process efficiency and this is accomplished primarily by pulverizing the feed material and further accomplished by completely drying the fuel and further classifying it to attain the optimum combustion surface-to-weight specifications suitable for the continuous firing of an industrial furnace under close temperature control. The pulverizing, drying and classification are all performed in a direct fired ring-roller mill to be described hereinafter. The combustion of the dried classified SDF is performed separately in the said furnace with a requirement of a maximum of 10% excess air.

Time is required both for drying and combustion. By performing flash drying and flash combustion separately and simultaneously, detention time is reduced to a minimum.

The required temperature for deodorizing the vapor recycle stream contaminated with the volatilization products of flash drying is obtained following the collection of SDF and preheating, by tangential injection of the vapor recycle stream into the furnace where the vapors are combined with and heated by the combustion gases. This geometry allows consistant cooling of the refractory at the minimum deodorizing temperature while internal temperatures may fluctuate from 2000° to 2500° F. (1100°–1400° C.). The efficiency of this deodorizing system is maintained by cooling the stack gases in a vapor preheater to retain process heat. By maintaining a stack temperature significantly less than the theoretical flame temperature of wet sludge (800° F.) (427° C.) the process becomes auto-thermal in processing feeds as low as 16–17% solids. Due to the reduced process size, equipment size and detention time over conventional incineration in performing the same operation and the reduced equipment and stack gas temperatures over conventional flash drying, thermal efficiency of about 90% using the process of this invention is not unexpected.

In a closed recirculation process, control is important. The furnace is automatically controlled from a centralized control panel to operate at the deodorizing temperature which, dependent on tests, will be set at a point between 900° and 1200° F. (480° and 650° C.). This control will operate independently of the rate of the vapor recycle stream. Oxygen analysis of exhaust gases will facilitate control of excess combustion air to about 10%. System exhaust gas temperature is cooled to about 75° F. of the dewpoint in maintaining continuous dry baghouse operation as well as maximum process efficiency. This temperature is about 250° F. under normal operating conditions. Control of this cooling is maintained by automatic operation of the recycle vapor fan wherein the mass flow rate of the recycled vapor stream may be varied from twice to up to four times the mass of the exhaust gases in cooling the exhaust gases in the vapor preheater. Such changes would reflect changes in feed moisture content which is not directly monitored.

The direct-fired roller mill recommended for this process is manufactured by the Williams Patent Crusher and Pulverizer Company as described in U.S. Pat. No. 3,283,698. This mill has been demonstrated to be capable of processing mixed digested sludge as proposed here. The Raymond Division of Combustion Equipment, Inc., the Babcock and Wilcox Co., and others maintain a similar line of roller mills and ring-roller mills which can also be useful in this invention.

The Williams ring-roller mill is designed to pulverize a wet feed such as raw wet coal. The coal is picked up from the rollers by preheated air and carried to a spinner separator in the upper part of the mill for classification. Coal that is pulverized passes through the classifier with the air while the oversize is returned by gravity. This controlled classification is particularly suited to the direct firing of rotary kilns and industrial furnaces where close temperature control is required and long periods of continuous operation are essential. A dry unclassified product may be drawn directly from the grinding area for other uses.

In processing sludge through a direct fired ring-roller mill, raw wet feed must be first mixed with unclassified bottom product in a one to one ratio and admitted to the center of the mill at 50–60% solids. Dropping through the rolls, pellets of about 20 mesh are formed as a mechanically agitated bed from which the bottom product may be drawn. Granular sludge from the surface of this bed is picked up by hot vapors from the furnace. These vapors are ducted into the mill at the rolls, drying the bottom product and forming a fluidized bed of sludge particles in the central portion of the mill. The granules grind against each other, flash drying to the consistency of fly ash. In the upper mill the spinner separator allows only properly sized particles to pass while maintaining the fluidized portion. Any size range to as fine as 90% through 400 mesh can be accomplished using the Williams Spinner Separator and the expected requirement is in the order of 70% through 200 mesh.

The advantage of the Williams mill over other roller mills is in the fact that the bottom product may be withdrawn for mixing with wet sludge to optimum feed concentrations. The opportunity is thus provided to withdraw a dried rolled sludge product which makes an excellent soil conditioner. Dry granular sludge can absorb a significant amount of water, without structural loss. It also makes a reasonable fuel which can be transported without the danger of explosion present in the more flammable SDF.

The vapor preheater is a gas phase/gas phase exchanger and many types of conventional heat exchange systems can be employed.

The cyclone collectors, baghouse, fans and stack are of conventional design offered by numerous manufacturers and suppliers.

The furnace specifically designed as described may also be produced by several manufacturers, as a variation of conventional air heater design.

As described under "Prior Art", problems are numerous in conventional flash drying. Firing SDF in the Flash Drying SDF process and using a versatile ring-roller mill solves most of the known flash drying problems. The recirculation of superheated sludge vapors provides a superior conveying system. This vapor has twice the heat transfer coefficient of air and eliminates the potential for spontaneous combustion. Excess air is minimized and SDF is utilized without exposure to air. Heat loss through the furnace walls is reduced relative to conventional flash drying with the reduced temperature [as low as 900° F. (480° C.) for deodorizing] and heat loss through the stack is minimized by maintaining minimum baghouse operation temperatures. Startup is facilitated by recycle of the vapor stream followed by fluidizing dried sludge and firing previously produced SDF. Continuous operation is provided and total municipal sludge production can be accepted.

ENERGY AND MASS BALANCE

The Energy and Mass Balance data given in Table I is based on a typical mixed digested municipal sewage sludge of 20% solids, a dry heating value of 7000 btu/lb. and a dry ash content of 37%. A conservative 40% excess combustion air, a 1200° F. (650° C.) deodorizing temperature and an estimated heat loss of 2.05 million btu/hr. have been used in this example. The result is a 10% product yield of SDF with an otherwise autothermal operation consuming 240 tons per day of wet sludge.

and holding moisture and due to its method of formation, has good structural stability.

Due to the independence of this invention on local refuse facilities and co-disposal programs, supplemental fuels and the sales of dry product, total municipal sludge production can be handled without shutdowns or even capacity reduction. This facilitates long term contracts for the disposal of municipal sludge wherein revenues would be received as disposal charge thus reducing operating costs to that point of profitability to private waste management industries.

While the process and product herein described in detail constitute preferred embodiments of the invention, it is to be understood that the invention is not limited to this precise process and product, and that changes may be made therein without departing from the spirit and scope of the invention.

TABLE I

| | ENERGY AND MASS BALANCE | | | | | | | | |
|---|---|---|---|---|---|---|---|---|---|
| PROCESS MATERIAL | WET SLUDGE | AIR | MILL FIRING INPUT GAS | MILL OUTPUT GAS | RECYCLE VAPOR STREAM | EXHAUST GASES | PRODUCT SDF | ASH | HEAT LOSS |
| Solids lb/hr | 2,520 | — | — | — | — | — | 252 | — | — |
| Ash lb/hr | 1,480 | — | — | — | — | — | 148 | 1,332 | — |
| Moisture/Vapor lb/hr | 16,000 | — | 21,933 | 37,933 | 37,933 | 17,704 | — | — | — |
| Oxygen lb/hr | — | 6,418 | 2,272 | 2,272 | 2,272 | 1,834 | — | — | — |
| Gases lb/hr | — | 21,365 | 32,846 | 32,846 | 32,846 | 26,513 | — | — | — |
| Total lb/hr | 20,000 | 27,783 | 57,051 | 73,051 | 73,051 | 46,051 | 400 | 1,332 | — |
| SCFM[1] | — | 6,000 | 15,000 | 20,600 | 20,600 | 12,100 | — | — | — |
| ACFM[2] | — | 6,000 | 47,900 | 28,100 | 46,800 | 19,100 | — | — | — |
| Heat Content mm btu/hr | 28.00 | — | 45.35 | 44.89 | 58.13 | 23.15 | 2.80 | — | 2.05 |
| Temp. °F. | 60° F. | 60° F. | 1200° F. | 250° F. | 720° F. | 360° F. | 60° F. | 60° F. | — |
| Temp. °C. | 16 | 16 | 650 | 121 | 383 | 182 | 16 | 16 | — |

[1] Standard cubic feet per minute
[2] Actual cubic feet per minute

Sludge drying processes are well known for flexibility of operations in return for low efficiency and high costs. This invention offers maximum flexibility in feed materials and product marketing as well as sludge disposal independent of product sales, fossil fuel costs and local refuse co-disposal programs in an efficient manner at investment and operating costs less than any drying or incineration process known.

The invention is capable of drying and consuming many forms of industrial sludges, waste solvents, paints, crude oil, coal mining wastes, wet char from the pyrolysis of refuse, food wastes, manure and animal wastes from feed lots as well as municipal sewage sludge.

One embodiment involves using the SDF to fuel the system. Excess SDF withdrawn from the system should be first stockpiled for emergency uses such as startup or combustion of high moisture sludge. Further excess is easily transported to local refuse fired facilities such as industrial boilers, power companies or cement kilns. It can also be disposed of in incinerators, landfill or given away to local residents for fertilizer.

If a market can be created in any given locality for dried sludge as a fertilizer or soil conditioner, the value of the dried sludge as such would exceed its value as a fuel and supplemental fuels could be economically used strictly dependent on sales potential. These fuels could be in the form of powdery refuse derived fuel (RDF), char, or raw low-sulfur coal as well as gas or oil. As a soil conditioner the rolled mill bottom product may be withdrawn from the mixing box line and bagged for sale. This granular product has a capacity for absorbing

I claim:
1. A process for disposing of sewage sludge comprising the steps of:
  (a) introducing the sludge into a direct fired roller mill for drying, pulverizing, and classification, thereby producing a dried product and a water vapor containing exhaust gas,
  (b) conveying said product from the mill by the vapor exhaust gas stream of the mill to a product collector wherein a portion of said product is removed and supplied to a furnace as fuel,
  (c) superheating said vapor exhaust gas stream leaving the product collector prior to injection into said furnace by heat exchange in a vapor preheater with the furnace exhaust gases, and
  (d) conducting a portion of said furnace exhaust gases to said mill for heating and drying said sludge.
2. The process of claim 1 wherein the furnace exhaust gas that passed through the vapor preheater is vented to the atmosphere after removal of entrained particles.
3. The process of claim 1, wherein the said furnace is adapted for deodorizing the vapor exhaust stream exiting from the direct fired mill comprising tangential injection of the vapor stream into the furnace and mixing the vapors with the combustion gases formed in the furnace, thereby permitting the cooling of the gases in the periphery of the furnace and the heating of the vapors by contact with the combustion gases in the interior of the furnace to the minimum deodorizing temperature.

4. The process of claim 1, wherein said furnace is automatically controlled to operate at or above the deodorizing temperature independent of the rate of the vapor stream.

5. The process of claim 4, wherein the amount of combustion air is automatically controlled by operation of the combustion air fan which in turn is determined by oxygen analysis of the furnace exhaust gases.

6. The process of claim 1, wherein the vapor stream contains less than 5% oxygen and greater than 40% superheated water vapor thereby rendering it a non-oxidizing conveying gas.

7. The process of claim 1, wherein the vapor preheater provides cooling of furnace exhaust gases to about 75° F. (40° C.) of the estimated dewpoint.

8. The process of claim 7, wherein the cooling of the exhaust gases is controlled by automatic operation of the recycle vapor fan which in turn is determined by the temperature of the system exhaust gases.

9. The process of claim 1, wherein recovery of sludge derived fuel is obtained when the feed moisture content is less than 84% by weight.

10. The product produced by the process of claim 1, comprising a dry sludge derived fuel.

* * * * *